US009347615B2

(12) United States Patent
Witte

(10) Patent No.: US 9,347,615 B2
(45) Date of Patent: May 24, 2016

(54) LOW-LOSS CRYOGENIC FLUID SUPPLY SYSTEM AND METHOD

(71) Applicant: AIR PRODUCTS AND CHEMICALS INC., Allentown, PA (US)

(72) Inventor: Thomas Gerard Witte, Seminole, FL (US)

(73) Assignee: AIR PRODUCTS AND CHEMICALS, INC., Allentown, PA (US)

( * ) Notice: Subject to any disclaimer, the term of this patent is extended or adjusted under 35 U.S.C. 154(b) by 328 days.

(21) Appl. No.: 14/026,760

(22) Filed: Sep. 13, 2013

(65) Prior Publication Data

US 2015/0075189 A1 Mar. 19, 2015

(51) Int. Cl.

*F17C 13/02* (2006.01)
*F17C 9/02* (2006.01)
(Continued)

(52) U.S. Cl.

CPC ... *F17C 9/02* (2013.01); *F17C 7/02* (2013.01); *F17C 7/04* (2013.01); *F17C 13/02* (2013.01); *F17C 2205/0332* (2013.01); *F17C 2205/0335* (2013.01); *F17C 2205/0338* (2013.01); *F17C 2221/011* (2013.01); *F17C 2221/014* (2013.01); *F17C 2221/016* (2013.01); *F17C 2221/017* (2013.01); *F17C 2223/0161* (2013.01); *F17C 2223/033* (2013.01); *F17C 2223/043* (2013.01); *F17C 2223/047* (2013.01); *F17C 2225/0123* (2013.01); *F17C 2225/035* (2013.01); *F17C 2227/01* (2013.01); *F17C 2227/0107* (2013.01); *F17C 2227/0302* (2013.01);
(Continued)

(58) Field of Classification Search

CPC .............. F17C 5/00; F17C 5/002; F17C 9/02; F17C 9/00; F17C 5/02; F17C 2223/03; F17C 2235/035; F17C 2223/036; F17C 13/02; F17C 13/025; F17C 2227/0107; F17C 2227/041; F17C 2227/042; F17C 2227/043; F17C 227/048; F17C 2250/0434

USPC ................................ 62/49.2, 49.1, 50.1, 50.2

See application file for complete search history.

(56) References Cited

U.S. PATENT DOCUMENTS

| | | | | |
|---|---|---|---|---|
| 4,986,086 | A * | 1/1991 | de Langavant | 62/239 |
| 5,386,707 | A | 2/1995 | Schulte | |

(Continued)

FOREIGN PATENT DOCUMENTS

| | | | |
|---|---|---|---|
| EP | 0 416 630 | A1 | 3/1991 |
| WO | 9418493 | A1 | 8/1994 |

OTHER PUBLICATIONS

PCT International Search Report, International Application No. PCT/US2014/055173, Apr. 15, 2015.

*Primary Examiner* — Marc Norman
*Assistant Examiner* — David Teitelbaum
(74) *Attorney, Agent, or Firm* — Larry S. Zelson

(57) ABSTRACT

A low-loss cryogenic fluid supply system having at least one main cryogenic fluid tank and a backup cryogenic fluid tank each having a vent set to a first pressure P1 and a pressure build circuit set to a second pressure P2, a main tank gas supply line configured to supply gas to a junction at a third pressure P3, a main tank liquid supply line configured to supply gas to the junction at a fourth pressure P4, a backup tank liquid supply line configured to supply gas to the junction at a fifth pressure P5, a backup tank backpressure regulator configured to supply gas to a point upstream to the main tank gas supply line at a sixth pressure P6, and an outlet supply line configured to supply gas from the junction at an end use pressure Pu, where $P1>P3\geq P2$, $P1\geq P6>P2$, $P6\geq P3>P4>P5>Pu$.

10 Claims, 2 Drawing Sheets

(51) Int. Cl.
*F17C 7/02* (2006.01)
*F17C 7/04* (2006.01)

(52) U.S. Cl.
CPC ...... *F17C 2227/039* (2013.01); *F17C 2227/04* (2013.01); *F17C 2250/01* (2013.01); *F17C 2250/03* (2013.01); *F17C 2250/036* (2013.01); *F17C 2250/0408* (2013.01); *F17C 2250/077* (2013.01); *F17C 2260/023* (2013.01); *F17C 2260/03* (2013.01); *F17C 2265/031* (2013.01); *F17C 2270/025* (2013.01)

(56) References Cited

U.S. PATENT DOCUMENTS 5,590,535 A 1/1997 Rhoades
5,771,946 A 6/1998 Kooy
6,470,690 B1 10/2002 Sicherman
2,729,948 A1 12/2009 Northgraves
2009/0320781 A1 12/2009 Kwon
2011/0023501 A1 2/2011 Schulte
2011/0146605 A1 6/2011 Dixon
2011/0314839 A1* 12/2011 Brook et al. .................. 62/49.1

* cited by examiner

LOW-LOSS CRYOGENIC FLUID SUPPLY SYSTEM AND METHOD

BACKGROUND

This application relates to a cryogenic fluid supply system with reduced or minimized loss of cryogenic fluid. More specifically, this application relates to a cryogenic fluid supply system of the type commonly use to supply medical oxygen on an intermittent basis in which the loss of cryogenic fluid is significantly reduced from the losses normally experienced by a conventional system.

In a conventional cryogenic fluid supply system, cryogen is supplied from a tank containing liquid cryogen, as well as some vapor cryogen in the headspace above the liquid. Typically, liquid is withdrawn from the bottom of the tank and vaporized for an end use. For example, conventional systems like this are often used for supplying medical oxygen from a liquid oxygen tank or dewar. However, because many uses are intermittent, a conventional system may experience significant losses of cryogen when the end use is temporarily stopped. Specifically, any liquid cryogen remaining in the supply lines and vaporizer takes on heat from the ambient environment, and as the resultant pressure increase pushes some of the remaining liquid back into the tank, some of that heat is also carried back into the tank. This causes the tank to increase in pressure. Ultimately, the tank needs to vent to relieve some of the excess pressure buildup, resulting in loss of cryogen. An object of the presently described system and method is to overcome this problem with conventional systems.

SUMMARY

An embodiment of a low-loss cryogenic fluid supply system includes at least one main cryogenic fluid tank and may include a backup cryogenic fluid tank. The main tank has a gas outlet, a liquid outlet, a pressure build circuit, and a vent, the vent being configured to exhaust pressure from the main tank at a first pressure P1, the pressure build circuit being configured to build pressure in the main tank to a second pressure P2 less than the first pressure P1. The backup tank has a gas outlet, a liquid outlet, a pressure build circuit, and a vent, the vent being configured to exhaust pressure from the backup tank at the first pressure P1, the pressure build circuit being configured to build pressure in the backup tank to the second pressure P2. A gas supply line is connected to the main tank gas outlet and has a pressure regulator configured to supply gas to a junction at a third pressure P3 greater than or equal to the second pressure P2 and less than the first pressure P1. A main liquid supply line has a heat exchanger to vaporize liquid from the main tank liquid outlet and a pressure regulator configured to supply the vaporized liquid to the junction at a fourth pressure P4 less than the third pressure P3. A backup liquid supply line has a heat exchanger to vaporize liquid from the backup tank liquid outlet and a pressure regulator configured to supply the vaporized liquid to the junction at a fifth pressure P5 less than the fourth pressure P4. A backup tank backpressure regulator is configured to enable gas flow from the backup tank gas outlet to a point in the gas supply line upstream of the gas supply line pressure regulator at a sixth pressure P6 greater than the third pressure P3 and less than the first pressure P1. An outlet supply line is configured to flow gas from the junction and having a point-of-use pressure regulator configured to supply gas at an end use pressure Pu than the fifth pressure P5.

In one aspect of the system, the backup tank has a low level switch. In another aspect of the system, a heat exchanger is positioned in gas supply line upstream of the gas supply line pressure regulator. In yet another aspect of the system, the cryogen is oxygen. In a further aspect of the system, the cryogen is nitrogen.

An embodiment of method of minimizing the loss of cryogenic fluid in a cryogenic fluid supply system utilizes at least one main cryogenic fluid tank having an internal pressure and a backup cryogenic fluid tank having an internal pressure. The method includes venting the main tank when the main tank internal pressure is greater than a first pressure P1, vaporizing cryogenic liquid and returning the vaporized liquid to the at least one main tank when the main tank internal pressure is less than a second pressure P2, wherein P2 is less than P1, venting the backup tank when the backup tank internal pressure is greater than the first pressure P1, and vaporizing cryogenic liquid and returning the vaporized liquid to the backup tank when the backup tank internal pressure is less than the second pressure P2. Cryogenic gas is supplied from the main tank to a junction at a pressure less than or equal to a third pressure P3, wherein P3 is less than P2. Cryogenic liquid is flowed from the main tank, vaporized, and supplied to the junction at a pressure less than or equal to a fourth pressure P4 when the pressure at the junction falls below P4. Cryogenic liquid is flowed from the backup tank, vaporized, and supplied to the junction at a pressure less than or equal to a fifth pressure P5 when the pressure at the junction falls below P5. Cryogenic gas is flowed from the backup tank when the backup tank internal pressure is greater than a sixth pressure P6 and greater than the main tank internal pressure, wherein P6 is greater than P3 and less than P1. Cryogenic gas is supplied from the junction to a point of use at an end use pressure Pu less than the fifth pressure P5.

In one aspect, the method further includes providing an alarm signal when a level of cryogenic liquid in the backup tank falls below a preset level. In another aspect, the method further includes warming the cryogenic gas in the main gas supply line. In yet another aspect, the cryogen used in the method is oxygen. In a further aspect, the cryogen used in the method is nitrogen.

Another embodiment of a low-loss cryogenic fluid supply system includes at least one main cryogenic fluid tank, the main tank having a gas outlet, a liquid outlet, a pressure build circuit, and a vent, the vent being configured to exhaust pressure from the main tank at a first pressure P1, the pressure build circuit being configured to build pressure in the main tank to a second pressure P2 less than the first pressure P1. A gas supply line is connected to the main tank gas outlet and having a pressure regulator configured to supply gas to a junction at a third pressure P3 greater than or equal to the second pressure P2 and less than the first pressure P1. A main liquid supply line has a heat exchanger to vaporize liquid from the main tank liquid outlet and a pressure regulator configured to supply the vaporized liquid to the junction at a fourth pressure P4 less than the third pressure P3. An outlet supply line is configured to flow gas from the junction and having a point-of-use pressure regulator configured to supply gas to a point of use at a use pressure Pu less than the fourth pressure P4.

In one aspect, the system further includes a low level switch in the main tank.

In another aspect, the system further includes a backup cryogenic fluid tank, the backup tank having a gas outlet, a liquid outlet, a pressure build circuit, and a vent, the vent being configured to exhaust pressure from the backup tank at the first pressure P1, the pressure build circuit being configured to build pressure in the backup tank to the second pressure P2. A backup liquid supply line has a heat exchanger to vaporize liquid from the backup tank liquid outlet and a pressure regulator configured to supply the vaporized liquid to the junction at a fifth pressure P5 less than the fourth pressure P4.

In still another aspect, system further includes a backup tank backpressure regulator configured to enable gas flow from the backup tank gas outlet to a point in the gas supply line upstream of the gas supply line pressure regulator at a sixth pressure P6 greater than the third pressure P3 and less than the first pressure P1.

In yet another aspect, the system further includes a low level switch in the backup tank.

The various aspects of the system disclosed herein can be used alone or in combinations with each other.

DETAILED DESCRIPTION

Figure 1:
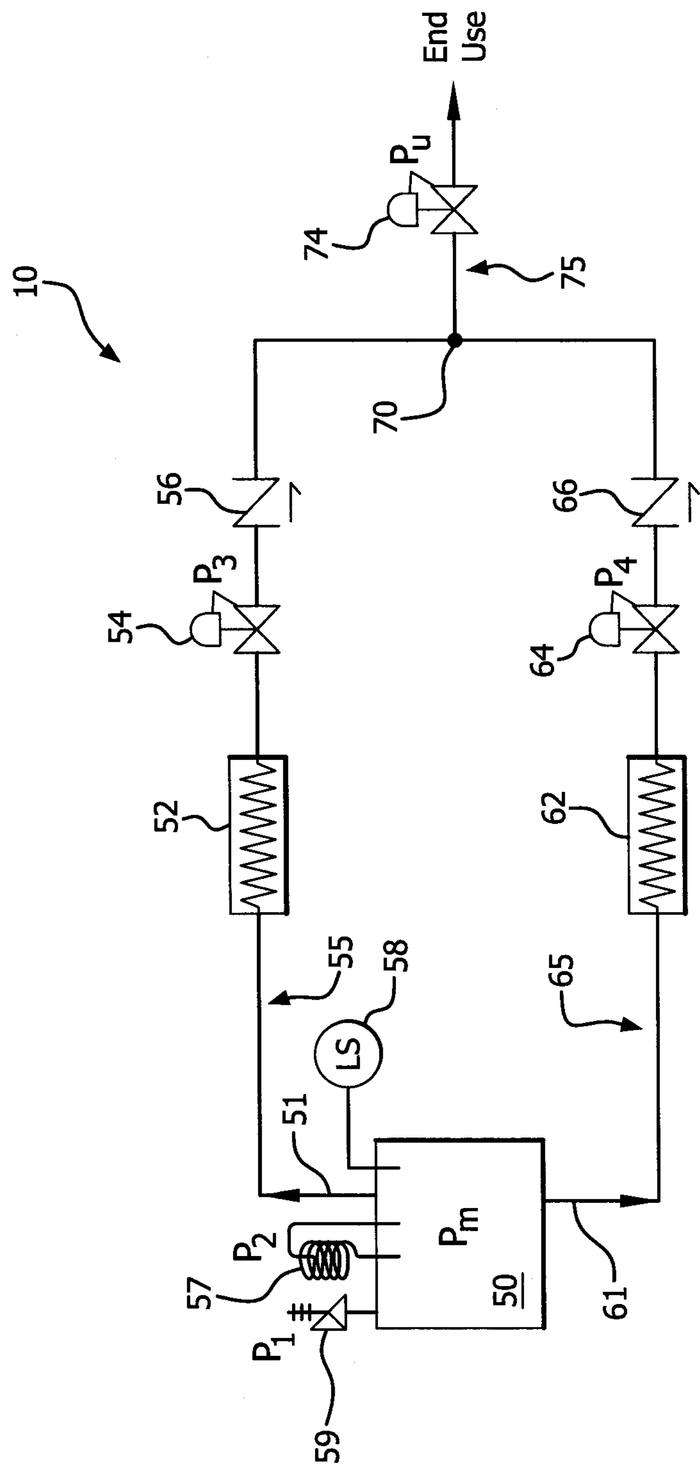
FIG. 1 is a schematic view of an embodiment of a low-loss cryogenic fluid supply system.

FIG. 1 shows an embodiment of a low-loss cryogenic fluid supply system 10. Although one of the commercially significant uses for such a system 10 is to supply medical oxygen, such a system 10 can also be used to supply any other fluid that can be transported, stored, and delivered in cryogenic form, including but not limited to nitrogen, argon, and helium. The system 10 includes at least one main cryogenic fluid tank 50. The system 10 can perform equally well with one, two, or three or more main cryogenic fluid tanks 50, so that the number of tanks 50 can be adjusted depending on the particular installation and space requirements.

The main tank 50 is operated at an internal pressure Pm. The maximum main tank internal pressure is set at a first pressure P1, by a vent valve 59. A pressure build circuit 57, as known in the art, is operable to increase the main tank internal pressure when it falls below a second pressure P2. For typical cryogenic fluid installations, the first (vent) pressure P1 is set to a pressure from about 200 PSIG to about 275 PSIG, and is preferably about 250 PSIG, while the second (pressure build circuit) pressure P2 is set to a pressure from about 140 PSIG to about 200 PSIG, and is preferably about 160 PSIG. When the main tank 50 is not supplying any cryogenic fluid, heat leak typically causes a slow increase in pressure, and if Pm reaches P1, the vent valve 59 will open to relieve pressure from the main tank 50. When the main tank 50 is supplying cryogenic fluid at a high flow rate, Pm may drop below P2, at which point the pressure build circuit 57 will become and remain activated until Pm reaches P2.

The main tank 50 includes a gas outlet 51 for supplying cryogenic gas or vapor, and a liquid outlet 61 (often in the form of a diptube) for supplying cryogenic liquid.

A gas supply line 55 is connected to the main tank gas outlet 51. A heat exchanger 52 may be positioned downstream of the junction 26 to warm the cryogenic gas flowing from the tank 50 to a temperature suitable for use. A pressure regulator 54 in the gas supply line 55 reduces the pressure to a third pressure P3, which is supplied to a junction 70. The third pressure P3 is greater than or equal to the second (pressure build) pressure P2. The third pressure P3 is set to a pressure from about 140 PSIG to about 190 PSIG, and is preferably about 160 PSIG. A check valve 56 may be positioned downstream of the pressure regulator 54 and upstream of the junction 70 to prevent backflow into the gas supply line 55.

A main liquid supply line 65 is connected to the main tank liquid outlet 61. A heat exchanger 62 is positioned downstream of the liquid outlet 61 to vaporize the cryogenic liquid and warm the resultant cryogenic gas or vapor. A pressure regulator 64 in the main liquid supply line 65 reduces the gas pressure to a fourth pressure P4, which is supplied to the junction 70 when needed. The fourth (main liquid supply) pressure P4 is less than the third (gas supply) pressure P3, so that gas is supplied via the main liquid supply line 65 only when the gas supply line 55 has insufficient pressure to meet the end use flow requirements. A check valve 66 may be positioned downstream of the pressure regulator 64 and upstream of the junction 70 to prevent backflow into the main liquid supply line 65. The fourth pressure P4 is set to a pressure from about 120 PSIG to about 160 PSIG, and is preferably about 140 PSIG.

An outlet supply line 75 is connected to the junction 70 and includes a point-of-use pressure regulator 74 to reduce the pressure of the gas to an end use pressure Pu suitable for end use. The end use pressure Pu is less than the fourth (main liquid supply) pressure P4. The end use is set to a pressure from about 25 PSIG to about 100 PSIG, and is preferably about 65 PSIG.

In sum, the relationship of the pressure setpoints described above in the system 10 is as follows: (a) $P1 \geq Pm$, (b) $P1 > P3 \geq P2$, and (c) $P3 > P4 > Pu$.

The system 10 may further include a low level switch 58 in the main tank 50 to alert an operator than the supply of cryogenic fluid is running low.

The system 10 may further include a heat exchanger 52 in gas supply line 55 upstream of the gas supply line pressure regulator 54 to warm the cryogenic gas to a temperature suitable for end use.

In use, the system 10 minimizes the loss of cryogenic fluid by operating in the following sequence. First, only if the system 10 is not in use for an extended period of time will the main tank pressure Pm increase sufficiently by natural heat leak to necessitate venting of cryogenic gas via the vent 59.

Next, when gas is demanded at the point of use, the system 10 draws only cryogenic gas from the main tank 50 via the gas supply line 55, as long as the main tank 50 is generating enough cryogenic gas. Preferably, this gas is warmed by heat exchanger 52 to a temperature suitable for end use. This gas is regulated to a pressure less than or equal to the third pressure P3 by the pressure regulator 54. If the main tank 50 is not generating enough gas through natural heat leak, the pressure build circuit 57 operates to add heat to the main tank 50, thereby increasing and maintaining the pressure Pm in the main tank 50. If the end use is stopped while only gas is being drawn from the main tank 50, the cryogen gas remaining in the gas supply line 55 will take on some heat, but far less than a liquid cryogen would take on, and very little of this heat will be returned to the main tank 50. Therefore, the resultant loss of cryogen is maintained at a very low level during such a temporary shutdown of end use demand.

Next, only if end use demand exceeds the ability of the main tank pressure build circuit 57 to maintain the main tank pressure Pm, the system 10 draws cryogenic liquid from the main tank 50 via the main liquid supply line 65 and vaporizes that liquid in the heat exchanger 62. When the main tank pressure Pm drops, the supply pressure to the pressure regulator 54 will drop sufficiently that the pressure at the junction 70 falls below the third pressure P3 to the fourth pressure P4, thereby enabling flow through the main liquid supply line 65. Flow will continue through the main liquid supply line 65 as long as the pressure at the junction 70 remains at or below the fourth pressure P4, which is the output of the pressure regulator 64.

By lessening the demand on the gas supply line 55, the pressure build circuit 57 is typically able to restore the main tank pressure Pm sufficiently to enable the main liquid supply line flow to cease, when the main tank 50 still contains an appreciable amount of cryogenic liquid. However, when the liquid level in the main tank 50 is running low, the pressure build circuit 57 will not be able to generate sufficient pressure to return to gas-only supply, and liquid will continue to be drawn from the liquid outlet 61 as the pressure at the junction 70 remains at or below the fourth pressure P4.

If the end use is stopped while both gas and liquid are being drawn from the main tank 50, some additional heat will be returned to the main tank 50 from the liquid taking on heat in the main liquid supply line 65. However, because of the configuration of the system 10, liquid was being drawn because the main tank pressure Pm was too low, and specifically was less than the setpoint P2 of the pressure build circuit 57. Therefore, any heat returned to the main tank 50, and the resultant pressure increase in the main tank 50, will merely restore the main tank pressure Pm to the desired range (i.e., greater than or equal to P2 and less than or equal to P1) and will likely result in no, or minimal, venting or loss of cryogen.

Finally, when the level in the backup tank 20 reaches a point indicating that the tank 50 needs to be refilled, the level switch 58 alarms. By this point, the pressure build circuit 57 will be running continuously and cryogen will be flowing through both the gas supply line 55 and the main liquid supply line 65 in order to meet the end use demand.

Figure 2:
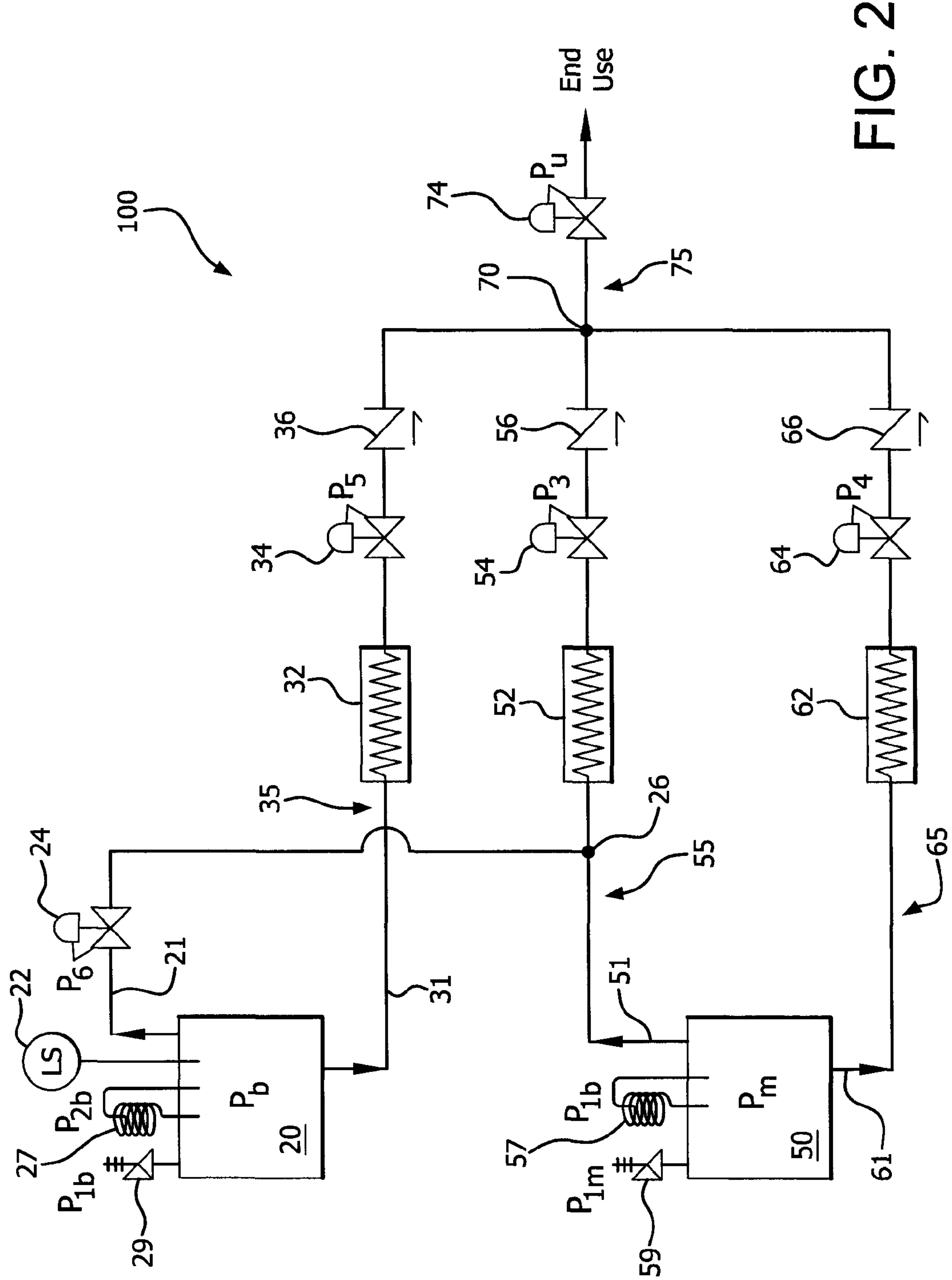
FIG. 2 is a schematic view of another embodiment of a low-loss cryogenic fluid supply system.

FIG. 2 shows an embodiment of a low-loss cryogenic fluid supply system 100. The system 100 includes at least one main cryogenic fluid tank 50 and a backup cryogenic fluid tank 20. The system 100 can perform equally well with one, two, or three or more main cryogenic fluid tanks 50, so that the number of tanks 50 can be adjusted depending on the particular installation and space requirements. Also, more than one backup tank 20 may be used to provided additional backup volume, although typically one backup tank 20 is sufficient.

The main tank 50 is operated at an internal pressure Pm. The maximum main tank internal pressure is set at a first pressure P1m, by a vent valve 59. A pressure build circuit 57, as known in the art, is operable to increase the main tank internal pressure when it falls below a second pressure P2m. For typical cryogenic fluid installations, the first (vent) pressure P1m is set to a pressure from about 200 PSIG to about 275 PSIG, and is preferably about 250 PSIG, while the second (pressure build circuit) pressure P2m is set to a pressure from about 140 PSIG to about 200 PSIG, and is preferably about 160 PSIG. When the main tank 50 is not supplying any cryogenic fluid, heat leak typically causes a slow increase in pressure, and if Pm reaches P1m, the vent valve 59 will open to relieve pressure from the main tank 50. When the main tank 50 is supplying cryogenic fluid at a high flow rate, Pm may drop below P2m, at which point the pressure build circuit 57 will become and remain activated until Pm reaches P2m.

The main tank 50 includes a gas outlet 51 for supplying cryogenic gas or vapor, and a liquid outlet 61 (often in the form of a diptube) for supplying cryogenic liquid.

The backup tank 20 is operated at an internal pressure Pb. The maximum backup tank internal pressure is set at a first pressure P1b, by a vent valve 29. A pressure build circuit 27, as known in the art, is operable to increase the main tank internal pressure when it falls below a second pressure P2b. When the backup tank 20 is not supplying any cryogenic fluid, heat leak typically causes a slow increase in pressure, and if Pb reaches P1b, the vent valve 29 will open to relieve pressure from the backup tank 20. When the backup tank 20 is supplying cryogenic fluid at a high flow rate, Pb may drop below P2b, at which point the pressure build circuit 27 will become and remain activated until Pb reaches P2b.

Usually, P1b will be approximately equal to P1m, and P2b will be approximately equal to P2m; therefore, P1b and P1m are sometimes referred to generically herein as P1, and P2b and P2m are sometimes referred to generically herein as P2.

The backup tank 20 includes a gas outlet 21 and a backup tank backpressure regulator 24 that enables gas flow from the gas outlet 21 at a sixth pressure P6, wherein P6 is greater than the second pressure P2 and less than the first pressure P1. The backpressure regulator 24 helps to decrease loss of cryogenic fluid by venting from the backup tank 20, instead making cryogenic gas available for use via the gas outlet 21 when the backup tank internal pressure Pb is above the pressure build circuit pressure P2 but below the vent pressure P1. The backpressure regulator pressure P6 is set to a pressure from about 160 PSIG to about 225 PSIG, and is preferably about 200 PSIG.

A gas supply line 55 is connected to the main tank gas outlet 51, and is also connected to the downstream side of the backup tank backpressure regulator 24 at a junction 26. A heat exchanger 52 may be positioned downstream of the junction 26 to warm the cryogenic gas flowing from the tanks 20 and 50 to a temperature suitable for use. A pressure regulator 54 in the gas supply line 55 reduces the pressure to a third pressure P3, which is supplied to a junction 70. The third pressure P3 is greater than or equal to the second (pressure build) pressure P2 and less than the sixth (backup tank backpressure regulator) pressure P6. The third pressure P3 is set to a pressure from about 140 PSIG to about 190 PSIG, and is preferably about 160 PSIG. A check valve 56 may be positioned downstream of the pressure regulator 54 and upstream of the junction 70 to prevent backflow into the gas supply line 55.

A main liquid supply line 65 is connected to the main tank liquid outlet 61. A heat exchanger 62 is positioned downstream of the liquid outlet 61 to vaporize the cryogenic liquid and warm the resultant cryogenic gas or vapor. A pressure regulator 64 in the main liquid supply line 65 reduces the gas pressure to a fourth pressure P4, which is supplied to the junction 70 when needed. The fourth (main liquid supply) pressure P4 is less than the third (gas supply) pressure P3, so that gas is supplied via the main liquid supply line 65 only when the gas supply line 55 has insufficient pressure to meet the end use flow requirements. A check valve 66 may be positioned downstream of the pressure regulator 64 and upstream of the junction 70 to prevent backflow into the main liquid supply line 65. The fourth pressure P4 is set to a pressure from about 120 PSIG to about 160 PSIG, and is preferably about 140 PSIG.

A backup liquid supply line 25 is connected to the backup tank liquid outlet 31. A heat exchanger 32 is positioned downstream of the liquid outlet 31 to vaporize the cryogenic liquid and warm the resultant cryogenic gas or vapor. A pressure regulator 34 in the backup liquid supply line 35 reduces the gas pressure to a fifth pressure P5, which is supplied to the junction 70 when needed. The fifth (backup liquid supply) pressure P5 is less than the fourth (main liquid supply) pressure P4, so that gas is supplied via the backup liquid supply line 35 only when the main tank, via the gas supply line 55 and the main liquid supply line 65, have insufficient pressure to meet the end use flow requirements. A check valve 26 may be positioned downstream of the pressure regulator 24 and upstream of the junction 70 to prevent backflow into the backup liquid supply line 25. The fifth pressure P5 is set to a pressure from about 100 PSIG to about 140 PSIG, and is preferably about 120 PSIG.

An outlet supply line 75 is connected to the junction 70 and includes a point-of-use pressure regulator 74 to reduce the pressure of the gas to an end use pressure Pu suitable for end use. The end use pressure Pu is less than the fifth (backup liquid supply) pressure P5. The end use pressure is set to a pressure from about 25 PSIG to about 100 PSIG, and is preferably about 65 PSIG.

In sum, the relationship between the pressure setpoints described above in the system 100 is as follows: (a) $P1 \geq Pm \approx Pb$, (b) $P1 > P3 \geq P2$, (c) $P1 \geq P6 > P2$, and (d) $P6 \geq P3 > P4 > P5 > Pu$.

The system 100 may further include a low level switch 22 in the backup tank 20 to alert an operator than the supply of cryogenic fluid is running low. Because of the relative pressure settings of the pressure regulators 54, 64, and 34, the main tank 50 will drain before the backup tank 20, so that alarming the level on the backup tank 20 provides the most accurate indication that the main tank 50 needs to be replaced or refilled. An advantage of the system 100 is that only one tank level alarm is required, on the backup tank 20, regardless the number of main tanks 20 that are included in the system 100.

The system 100 may further include a heat exchanger 52 in gas supply line 55 downstream of the junction 26 and upstream of the gas supply line pressure regulator 54 to warm the cryogenic gas to a temperature suitable for end use.

Note that the pressure regulators described herein may be either locally or remotely set. For example, common locally set pressure regulators are of a mechanical design that allows the output pressure to be set by a spring-loaded knob adjusting a diaphragm. Alternatively, common remotely set pressure regulators may include either a pneumatic diaphragm arrangement or an electric servo arrangement that receives a signal from a controller and/or an transducer to drive the pressure regulator in a more open or more closed direction to maintain a desired output pressure.

In use, the system 100 minimizes the loss of cryogenic fluid by operating in the following sequence. First, only if the system 100 is not in use for an extended period of time will the main tank pressure Pm and/or the backup tank pressure Pb increase sufficiently by natural heat leak to necessitate venting of cryogenic gas via one or both of the vents 59 and 29.

Next, when gas is demanded at the point of use, the system 100 draws only cryogenic gas from the main tank 50 via the gas supply line 55, as long as the main tank 50 is generating enough cryogenic gas. Preferably, this gas is warmed by heat exchanger 52 to a temperature suitable for end use. This gas is regulated to a pressure less than or equal to the third pressure P3 by the pressure regulator 54. If the main tank 50 is not generating enough gas through natural heat leak, the pressure build circuit 57 operates to add heat to the main tank 40, thereby increasing and maintaining the pressure Pm in the main tank 50. In addition, gas may be supplied by the backup tank 20 if natural heat leak cause the backup tank pressure Pb to increase about the pressure setting P3 of the backpressure regulator 24.

If the end use is stopped while only gas is being drawn from the main tank 50 and/or from the backup tank 20, the cryogen gas remaining in the gas supply line 55 will take on some heat, but far less than a liquid cryogen would take on, and very little of this heat will be returned to the main tank 50 and/or the backup tank 20. Therefore, the resultant loss of cryogen is maintained at a very low level during such a temporary shutdown of end use demand.

Next, only if end use demand exceeds the ability of the main tank pressure build circuit 57 to maintain the main tank pressure Pm, the system 100 draws cryogenic liquid from the main tank 50 via the main liquid supply line 65 and vaporizes that liquid in the heat exchanger 62. When the main tank pressure Pm drops, the supply pressure to the pressure regulator 54 will drop sufficiently that the pressure at the junction 70 falls below the third pressure P3 to the fourth pressure P4, thereby enabling flow through the main liquid supply line 65. Flow will continue through the main liquid supply line 65 as long as the pressure at the junction 70 remains at or below the fourth pressure P4, which is the output of the pressure regulator 64.

By lessening the demand on the gas supply line 55, the pressure build circuit 57 is typically able to restore the main tank pressure Pm sufficiently to enable the main liquid supply line flow to cease, when the main tank 50 still contains an appreciable amount of cryogenic liquid. However, when the liquid level in the main tank 50 is running low, the pressure build circuit 57 will not be able to generate sufficient pressure to return to gas-only supply, and liquid will continue to be drawn from the liquid outlet 61 as the pressure at the junction 70 remains at or below the fourth pressure P4.

If the end use is stopped while both gas and liquid are being drawn from the main tank 50, some additional heat will be returned to the main tank 50 from the liquid taking on heat in the main liquid supply line 65. However, because of the configuration of the system 100, liquid was being drawn because the main tank pressure Pm was too low, and specifically was less than the setpoint P2 of the pressure build circuit 57. Therefore, any heat returned to the main tank 50, and the resultant pressure increase in the main tank 50, will merely restore the main tank pressure Pm to the desired range (i.e., greater than P2 and less than P1) and will likely result in no, or minimal, venting or loss of cryogen.

Next, only if end use demand exceeds the ability of the main tank 50 to supply enough cryogenic fluid to maintain sufficient pressure at the junction 70, the system draws cryogenic liquid from the backup tank 20 via the backup liquid supply line 35 and vaporizes that liquid in the heat exchanger 32. This will occur when the main tank pressure Pm drops sufficiently that the combination of the gas supply line 51 and the main liquid supply line 61 cannot meet the end use demand, and the pressure at the junction 70 falls below the fourth pressure P4 to the fifth pressure P5, thereby enabling flow through the backup liquid supply line 25. Flow will continue through the backup liquid supply line 25 as long as the pressure at the junction 70 remains at or below the fifth pressure P5, which is the output of the pressure regulator 24.

As the backup tank 20 begins to run low, the pressure build circuit 27 may need to operate to maintain sufficient pressure Pb in the backup tank 20 to feed the backup liquid supply line 21. Finally, when the level in the backup tank 20 reaches a point indicating that the tanks 20 and 50 need to be refilled, the level switch 22 alarms.

The present invention is not to be limited in scope by the specific aspects or embodiments disclosed in the examples which are intended as illustrations of a few aspects of the invention and any embodiments that are functionally equivalent are within the scope of this invention. Various modifications of the invention in addition to those shown and described herein will become apparent to those skilled in the art and are intended to fall within the scope of the appended claims.

The invention claimed is:

1. A low-loss cryogenic fluid supply system comprising:

at least one main cryogenic fluid tank, the main tank having a gas outlet, a liquid outlet, a pressure build circuit, and a vent, the vent being configured and set to exhaust pressure from the main tank at a first pressure PI, the pressure build circuit being configured to add heat to the main tank to thereby build pressure in the main tank to a second pressure P2 less than the first pressure PI;

a backup cryogenic fluid tank, the backup tank having a gas outlet, a liquid outlet, a pressure build circuit, and a vent, the vent of the backup tank being configured to exhaust pressure from the backup tank at the first pressure PI, the pressure build circuit of the backup tank being configured to add heat to the backup tank to thereby build pressure in the backup tank to the second pressure P2;

a gas supply line connected to the main tank gas outlet and having a pressure regulator configured and set to supply gas to a junction at a third pressure P3 greater than or equal to the second pressure P2 and less than the first pressure PI;

a main liquid supply line having a heat exchanger to vaporize liquid from the main tank liquid outlet and a pressure regulator configured and set to supply the vaporized liquid to the junction at a fourth pressure P4 less than the third pressure P3;

a backup liquid supply line having a heat exchanger to vaporize liquid from the backup tank liquid outlet and a pressure regulator configured and set to supply the vaporized liquid of the backup tank to the junction at a fifth pressure P5 less than the fourth pressure P4;

a backup tank backpressure regulator configured and set to enable gas flow from the backup tank gas outlet to a point in the gas supply line upstream of the gas supply line pressure regulator at a sixth pressure P6 greater than the third pressure P3 and less than the first pressure PI; and an outlet supply line configured to flow gas from the junction and having a point-of-use pressure regulator configured and set to supply gas at an end use pressure Pu less than the fifth pressure P5.

2. The low-loss cryogenic fluid supply system of claim 1, further comprising:

a low level switch in the backup tank.

3. The low-loss cryogenic fluid supply system of claim 1, further comprising: a heat exchanger in the gas supply line upstream of the gas supply line pressure regulator.

4. The low-loss cryogenic fluid supply system of claim 1, wherein the cryogen is oxygen.

5. The low-loss cryogen fluid supply system of claim 1, wherein the cryogen is nitrogen.

6. A low-loss cryogenic fluid supply system comprising:

at least one main cryogenic fluid tank, the main tank having a gas outlet, a liquid outlet, a pressure build circuit, and a vent, the vent being configured and set to exhaust pressure from the main tank at a first pressure P1, the pressure build circuit being configured to add heat to the main tank to thereby build pressure in the main tank to a second pressure P2 less than the first pressure P1;

a gas supply line connected to the main tank gas outlet and having a pressure regulator configured and set to supply gas to a junction at a third pressure P3 greater than or equal to the second pressure P2 and less than the first pressure P1;

a main liquid supply line having a heat exchanger to vaporize liquid from the main tank liquid outlet and a pressure regulator configured and set to supply the vaporized liquid to the junction at a fourth pressure P4 less than the third pressure P3; and an outlet supply line configured to flow gas from the junction and having a point-of-use pressure regulator configured and set to supply gas to a point of use at a use pressure Pu less than the fourth pressure P4.

7. The low-loss cryogenic fluid supply system of claim 6, further comprising:

a low level switch in the main tank.

8. The low-loss cryogenic fluid supply system of claim 6, further comprising:

a backup cryogenic fluid tank, the backup tank having a gas outlet, a liquid outlet, a pressure build circuit, and a vent, the vent of the backup tank being configured and set to exhaust pressure from the backup tank at the first pressure PI, the pressure build circuit of the backup tank being configured to build pressure in the backup tank to the second pressure P2; and a backup liquid supply line having a heat exchanger to vaporize liquid from the backup tank liquid outlet and a pressure regulator configured and set to supply the vaporized liquid of the backup tank to the junction at a fifth pressure P5 less than the fourth pressure P4.

9. The low-loss cryogenic fluid supply system of claim 8, further comprising:

a backup tank backpressure regulator configured and set to enable gas flow from the backup tank gas outlet to a point in the gas supply line upstream of the gas supply line pressure regulator at a sixth pressure P6 greater than the third pressure P3 and less than the first pressure P1.

10. The low-loss cryogenic fluid supply system of claim 8, further comprising:

a low level switch in the backup tank.

* * * * *